Figure 1:
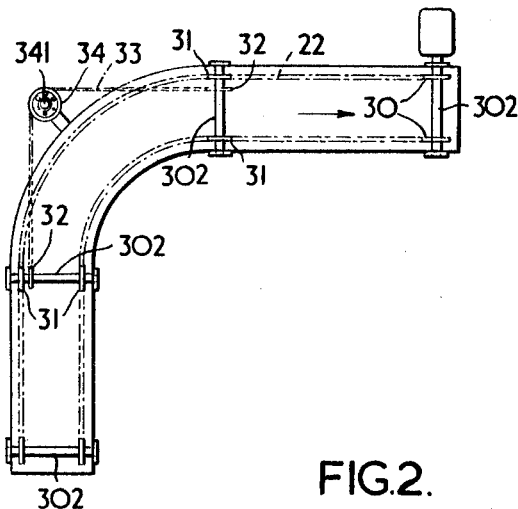

Aug. 9, 1966     A. D. BESSANT     3,265,193

ENDLESS CHAIN CONVEYORS

Filed July 28, 1964     6 Sheets-Sheet 1

Inventor:
Albert Douglas Bessant
Kenway, Jenney & Hildreth
attys.

Aug. 9, 1966  A. D. BESSANT  3,265,193
ENDLESS CHAIN CONVEYORS
Filed July 28, 1964  6 Sheets-Sheet 2
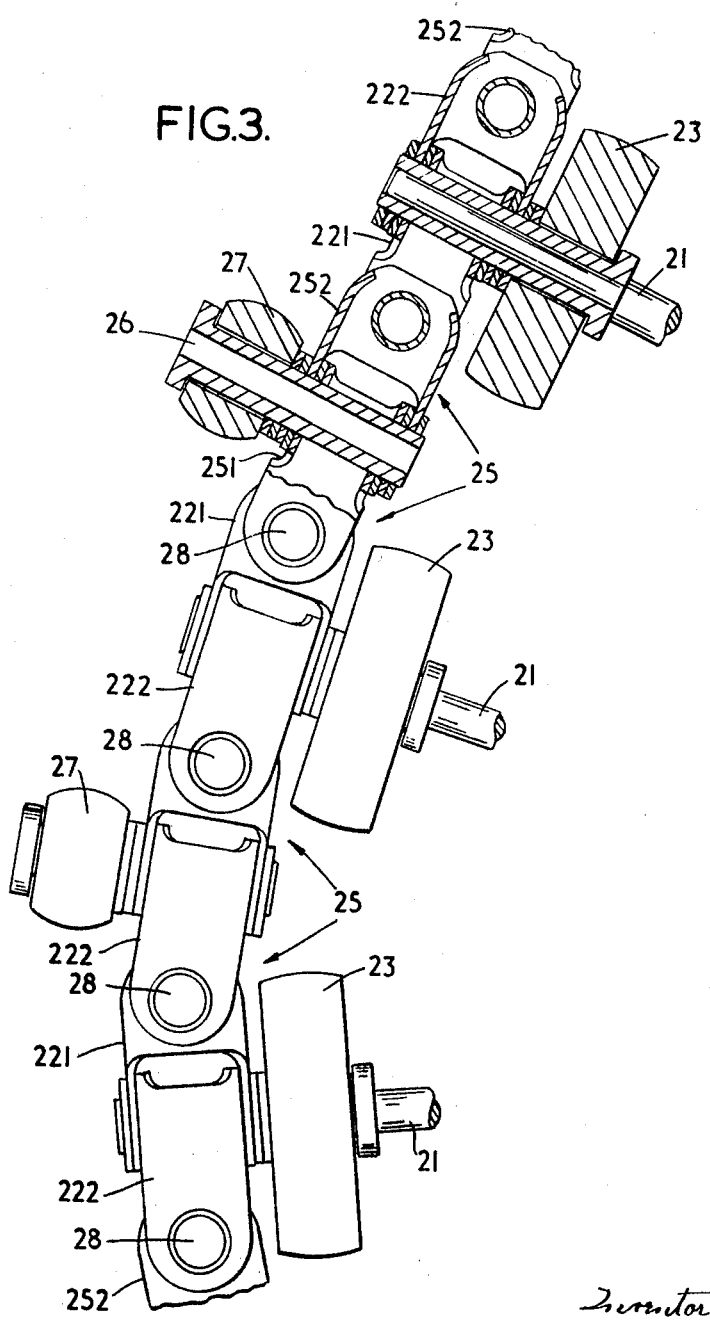

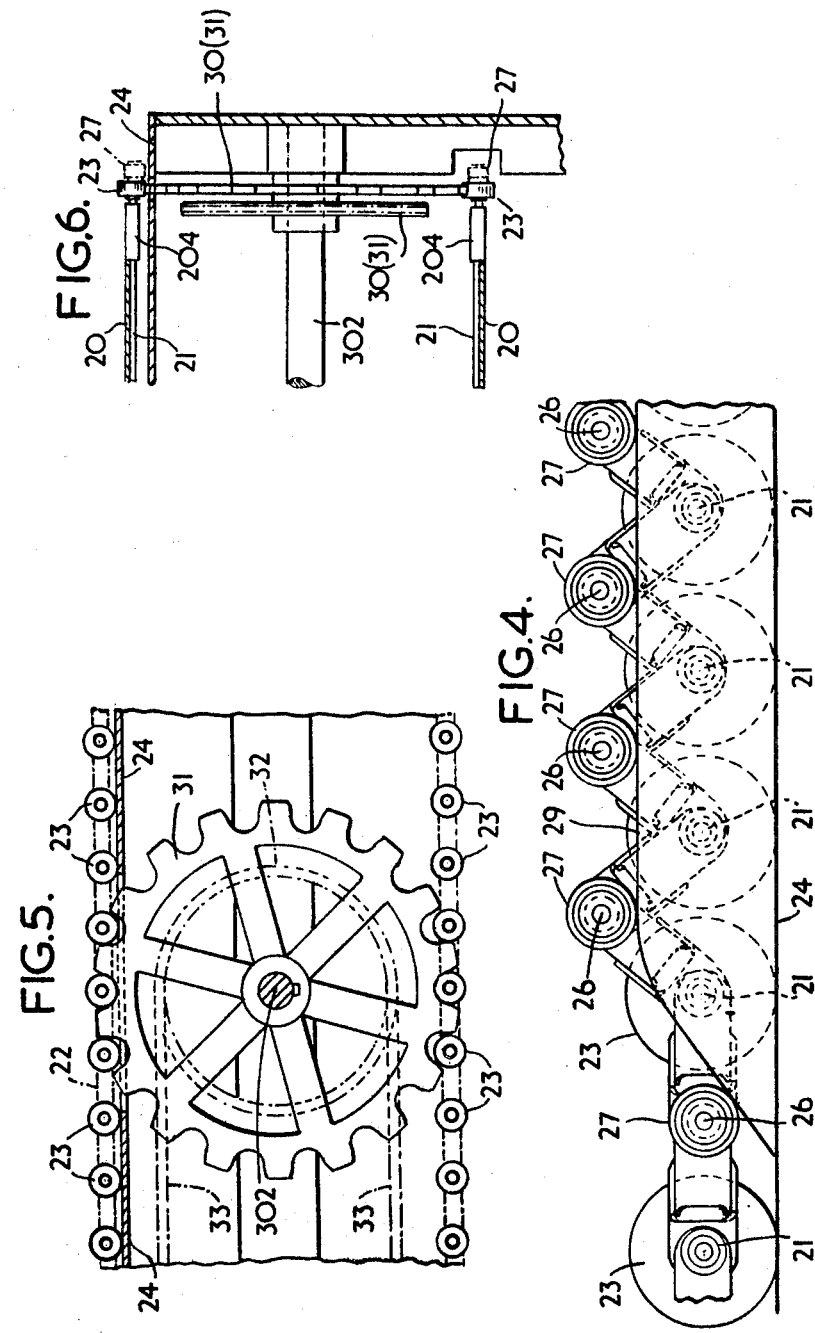

Aug. 9, 1966   A. D. BESSANT   3,265,193
ENDLESS CHAIN CONVEYORS
Filed July 28, 1964   6 Sheets-Sheet 4

Inventor:
Albert Douglas Bessant
Kenway, Jenney + Hildreth
attys.

Aug. 9, 1966  A. D. BESSANT  3,265,193

ENDLESS CHAIN CONVEYORS

Filed July 28, 1964  6 Sheets-Sheet 5

INVENTOR
ALBERT DOUGLAS BESSANT

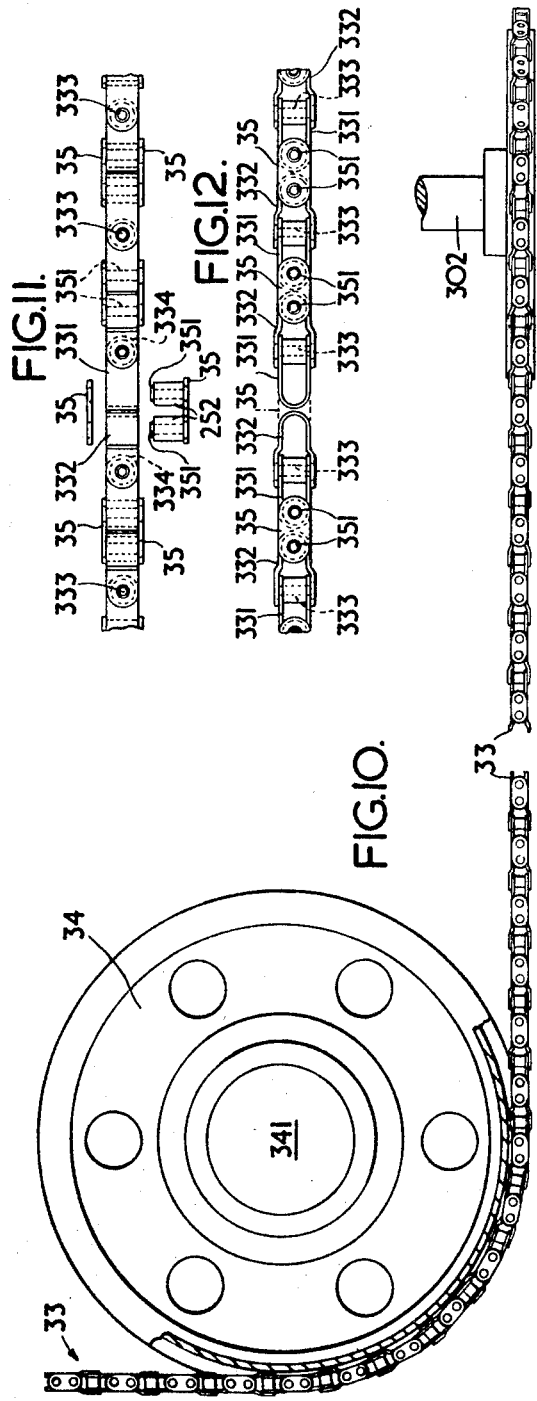

3,265,193
ENDLESS CHAIN CONVEYORS
Albert Douglas Bessant, Morden, England, assignor to Himpelm Engineers Ltd., Walsall, England, a corporation of Great Britain and Northern Ireland
Filed July 28, 1964, Ser. No. 385,631
20 Claims. (Cl. 198—182)

This invention has reference to endless chain conveyors.

With endless chain conveyors as at present constructed it is not possible to alter markedly the lateral direction of travel of the conveying surface or surfaces and the present invention has for its object to provide an endless chain conveyor which is capable of taking relatively sharp lateral turns so as to be capable if required of travel in a sinuous path.

Accordingly the invention consists of an endless chain conveyor in which the conveying surface or surfaces is or are supported by rollers adapted to run on tracks arranged at each side of the conveying surface or surfaces and in which the links of the endless driving chains are interconnected so as to permit hinging about both horizontal and vertical axes and in which control rollers are provided at each side of the conveying surface or surfaces intermediate the supporting rollers aforesaid, which are supported from the respective endless driving chains and which themselves are adapted to run on tracks provided around a lateral bend or curve to define and control the direction of travel of the endless driving chains said supporting surface where a multiplicity are employed being capable of an overlapping sliding movement relatively to each other or of looping where a continuous supporting surface is concerned whereby the supporting surface or surfaces is or are permitted to negotiate lateral bends or curves under the governance of said control rollers in association with the tracks provided therefor.

The invention also resides in an endless chain conveyor constructed arranged and adapted for use substantially as will be described hereinafter.

An embodiment of the invention will now be described with particular reference to the accompanying drawings which illustrate the invention as applied to an endless chain conveyor in which the conveying surface is in the form of transverse slats and in which the projected path of the conveyor is such that it is required to partake of a laterally deviating path with bends or curves which may subtend arcs of as much as 90°.

Figure 2:
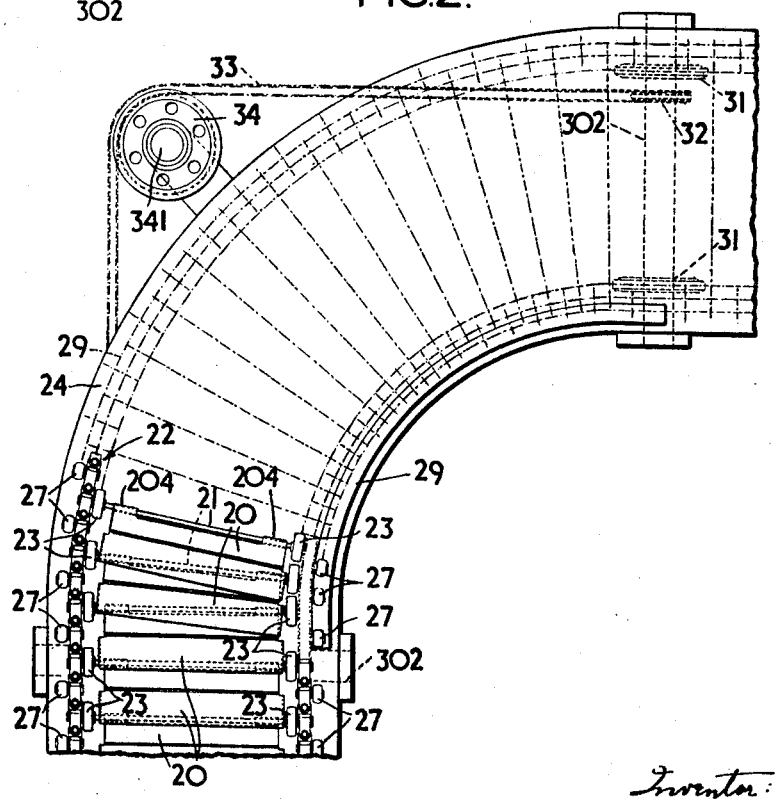
Figure 7:
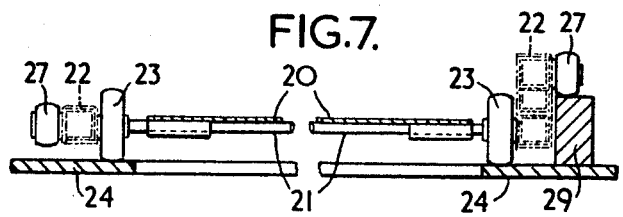
Figure 8:
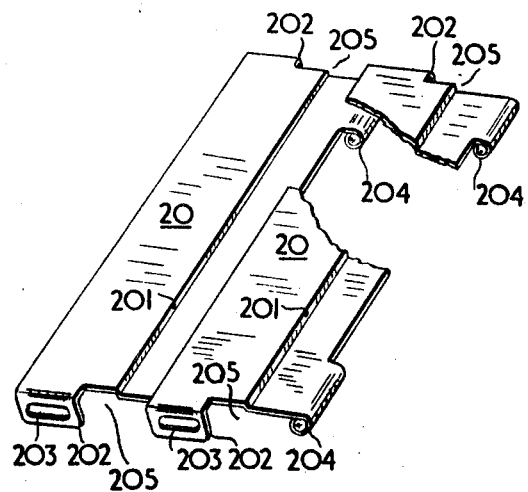
Figure 9:
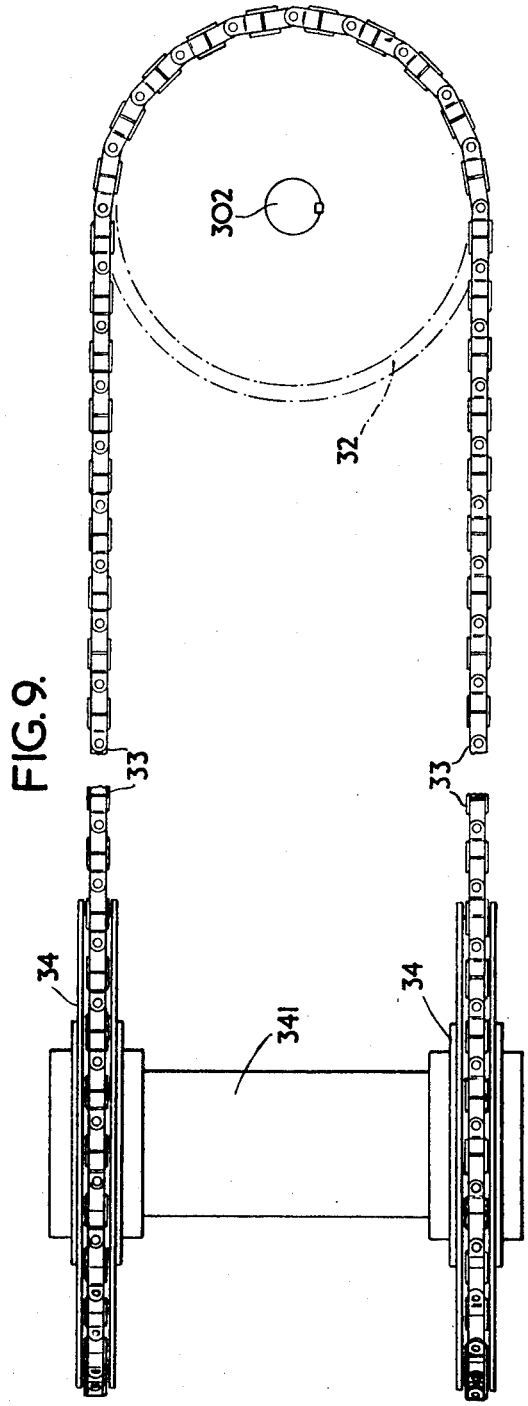

In the drawings:

FIGURE 1 is a diagrammatic view illustrating the general layout of a conveyor in accordance with the invention at a position when the conveyor is required to partake of a turn of 90°, FIGURE 2 is a fragmentary view on an enlarged scale illustrative of the conveyor depicted in FIGURE 1 at the turn, FIGURE 3 is a fragmentary view on an enlarged scale and partly in plan and partly in section of a portion of a driving chain, FIGURE 4 is a diagrammatic end view illustrating the action which takes place as a driving chain negotiates a turn or bend, FIGURE 5 is a fragmentary view in end elevation illustrating the manner of transmitting the drive to the driving chains, FIGURE 6 is a fragmentary view in vertical section and on a reduced scale illustrating the manner of transmitting the drive to the driving chains, FIGURE 7 is a transverse vertical section on a reduced scale illustrative of the manner of negotiating a turn or bend, FIGURE 8 is a perspective view illustrating the slats and the relationship of adjacent slats, FIGURE 9 is a fragmentary end view illustrative of the manner of resisting torque stresses on the driving chain at a bend, FIGURE 10 is a fragmentary view partly in plan and partly in section illustrative of the manner of resisting torque stresses on the driving chain at a bend, FIGURE 11 is a fragmentary view in side elevation illustrative of the manner of building the chain illustrated in FIGURES 9 and 10, and FIGURE 12 is a fragmentary view in plan of FIGURE 11.

In the drawings like numerals of reference indicate similar parts in the several views.

According to the said illustrated embodiment of the invention the slats 20 which constitute the conveying media are formed from sheet metal and are stepped adjacent to the rearwardly disposed ends as at 201 so that adjacent slats 20 may have a sliding overlap association with each other, see FIGURES 2 and 8.

Each slat 20 is provided at the leading end with downwardly turned side flanges 202 having therein elongated slots 203 and at the trailing end and on the underside with horizontal axially aligned rolled sections 204 which serve as bearings for horizontal axles 21 which also constitute horizontal pivots for the half links of the driving links of the driving chains, said driving chains being termed generally the driving chains 22. The axles 21 associated with the half links aforesaid are adapted to pass through the elongated slots 203 of the preceding links.

The stepped side portions and eyed portions of the slats 20 are notched at the ends as at 205 so that the effective overall width of the slats 20 remains the same, see FIGURE 8.

The axles 21 aforesaid extend beyond the ends of their associated slats 20 and have rotatably mounted on the projecting portions of each axle 21 intermediate the respective chains 22 and the presented flanged ends of the slats 20 rollers 23 hereinafter termed the "main rollers 23" which at the turns are adapted to run on tracks 24 which are always in the same plane as or which are parallel to the plane of the upper runs of the respective driving chains 22.

The driving chains 22 incorporate driving "links" comprising "inner" and "outer" half links 221, 222 respectively which are pivotally connected by the axles 21 aforesaid and "intermediate" two-part links herein termed generically as the intermediate links 25. The half links 251, 252 of the intermediate links 25 are capable of hinging about horizontal pins 26 which serve as axles for part spherical rollers 27 hereinafter termed "control rollers 27."

The inner half link 221 of a driving link is pivotally connected to the outer half link 252 of a succeeding intermediate link 25 so as to be capable of hinging about a vertical axis 28 whilst the inner half link 251 of the said intermediate link 25 is connected to the outer half link 222 of the succeeding driving link also in a manner which permits hinging about a vertical axis 28.

The control rollers 27 are adapted to run on tracks hereinafter termed "radius control tracks 29" which are arranged around the bends both on the outside and on the inside of the main tracks 24 and which are disposed at a higher level than the said main tracks 24. The radius control tracks 29 may be provided with overhanging flanges not shown for limiting the degree of upward movement permitted to the control rollers 27 as they negotiate a bend as will be described hereinafter.

The driving and idler sprockets 30 and 31 respectively for the driving chains 22 are mounted on axles 302 in accordance with a conventional practice.

The main rollers 23 engage with the teeth of the driving sprockets 30, 31 aforesaid, see FIGURE 5.

At the approach to a bend or curve and at the end of the bend or curve the axles 302 for the relevant idler sprockets 31 have mounted thereon auxiliary sprockets hereinafter termed "torque chain sprockets 32" around which are passed chains 33 which also pass around pulleys 34 hereinafter termed "torque chain pulleys 34" which are arranged on the outside of a bend on the central radius of the bend, said torque chain pulleys 34 being adapted for turning about vertical pivot pins 341.

The torque chains referred to generally by the reference numeral 33 are built up of two part main links 331, 332 which are capable of hinging about common horizontal axes constituted by pivot pins 333 and which are interconnected by auxiliary half links referred to generically by the reference numeral 35 which permit hinging of the respective half links 331, 332 of the main links connected thereto about vertical pivot pins 351. The pivot pins 333, 351 are provided with rotatable bearing rollers 334, 352 respectively as is customary in connection with conventional transmission chains.

The arrangement of the pulleys 34 and the sprockets 32 for the torque chains 33 is such that the paths of the runs to and from the sprockets 32 are tangential to the pulleys concerned, see FIGURES 1 and 10.

During travels in a straight path the slats 20 have a uniform lapover relationship to one another and the load thereon is supported by the main rollers 23 which run on the main tracks 24. As the slats 20 approach a bend the control rollers 27, see FIGURES 2 and 7, ride up and on to their relevant radius control tracks 29 so that the links carrying the main rollers 23 on the inside of the bend are drawn closer together so that adjacent portions of the slats 20 can slide over one another to a greater degree of overlap. The overhanging flanges of the radius control tracks 29 if provided hold the control rollers 27 on to their radius control tracks 29.

It is found that an endless chain conveyor constructed as aforesaid can be caused to travel around lateral bends subtending an arc of as much as 90° and to traverse a laterally deviating sinuous path without difficulty.

It will be understood that instead of solid sheet metal slats 20 slats of wire mesh may be employed or even a continuous belt which is formed so as to be capable of forming depending loops whilst progressing through the zone of a bend.

It will be appreciated that the torque chains 33 resist any torque stresses which may be set up as the driving chains 22 negotiate a lateral bend or curve.

I claim:
1. An endless chain conveyor incorporating a conveying surface, main rollers for supporting said conveying surface, tracks for said main rollers arranged at each side of the conveying surface, endless driving chains arranged at each side of the conveying surface having links which are interconnected so as to permit hinging about both horizontal and vertical axes, sprockets for carrying and driving said endless driving chains, control rollers provided at each side of the conveying surface intermediate the main rollers aforesaid, means for supporting said control rollers from the respective endless driving chains, and auxiliary tracks for the control rollers provided around a lateral bend to define and control the direction of travel of the endless driving chains around the lateral bend, said conveying surface being capable of variation of effective surface area to permit the conveying surface to negotiate lateral bends under the governance of said control rollers in association with the auxiliary tracks aforesaid.

2. An endless chain conveyor as claimed in claim 1 in which the tracks for the main rollers and the auxiliary tracks are arranged at different levels.

3. An endless chain conveyor as claimed in claim 1 in which the auxiliary tracks are arranged at a higher level than the tracks for the main rollers and are located on the outside of the respective endless chains around a lateral bend.

4. An endless chain conveyor as claimed in claim 1 in which the main rollers are located on the inside of their respective endless chains whilst the control rollers are located on the outer side thereof.

5. An endless chain conveyor incorporating a conveying surface, main rollers for supporting said conveying surface, tracks for said main rollers arranged at each side of the conveying surface, endless driving chains incorporating driving links each of which consists of half-links which are hingedly connected at their inwardly presented ends about common pivots and links intermediate the driving links each of which consists of half-links which are hingedly connected at their inwardly presented ends about common pivots the axes of which are parallel to the axes of the common pivots of the aforesaid driving links and in which the outer end portion of a half-link of a driving link is pivotally connected to the outer end portion of a half-link of a preceding intermediate link by a common pivot, the axis of which is at right angles to the axis of the common axes aforesaid and in which the outer portion of the other half-link of the said driving link is connected to the outer end portion of a half-link of a succeeding intermediate link in a like manner whereby the endless driving chains can hinge about axes arranged at right angles to each other, sprockets for carrying and driving said endless driving chains, control rollers provided at each side of the conveying surface intermediate the main rollers aforesaid, means for supporting said control rollers from the respective endless driving chains, and auxiliary tracks for the control rollers provided around a lateral bend to define and control the direction of travel of the endless driving chains around said bend, said conveying surface being capable of variation of effective surface area to permit the conveying surface to negotiate lateral bends under the governance of said control rollers in association with the auxiliary tracks aforesaid.

6. An endless chain conveyor as claimed in the preceding claim 5 in which the common pivots for the driving links are also common to the endless driving chains in each side of the conveyor and in which the said common pivots serve to carry the main rollers.

7. An endless chain conveyor as claimed in claim 5 in which the common pivots for the intermediate half-links which are parallel to the pivots for the driving links serve also to carry the control rollers.

8. An endless chain conveyor as claimed in claim 5 in which the hinging of the links of the driving chain is such that as the control rollers negotiate an auxiliary track the main rollers on the inside of the bend or curve may approach one another whilst the main rollers on the outside of the bend or curve may move away from each other to the limit of the extent permitted.

9. An endless chain conveyor as claimed in claim 5 in which the main rollers are engaged by the teeth of the carrying and driving sprockets.

10. An endless chain conveyor incorporating a conveying surface in the form of a plurality of transversely disposed slats which are stepped and arranged in overlapping sliding movement relatively to each other, main rollers for supporting said conveying surface, tracks for said main rollers arranged at each side of the conveying surface, endless driving chains arranged at each side of the conveying surface having links which are interconnected so as to permit hinging about both horizontal and vertical axes, sprockets for carrying and driving said endless driving chains, control rollers provided at each side of the conveying surface intermediate the main rollers aforesaid, means for supporting said control rollers from the respective endless driving chains, auxiliary tracks for the control rollers provided around a lateral bend to define and control the direction of travel of the endless driving chain around the lateral bend, said conveying surface being capable of variation of effective surface area to permit the conveying surface to negotiate lateral bends under the governance of said control rollers in association with the auxiliary tracks aforesaid.

11. An endless chain conveyor as claimed in claim 10 in which the slats are provided with bearings for the reception of the common pivots for the main rollers.

12. An endless chain conveyor as claimed in claim 10 in which the slats are provided at the sides with downwardly turned portions having therein elongated slots through which the common pivot pins for the main rollers are arranged to pass.

13. An endless chain conveyor as claimed in claim 10 in which the slats are notched at the ends to ensure that the effective width of the slats remains constant.

14. An endless chain conveyor as claimed in claim 10 in which provision is made for limiting the degree of displacement permitted to the control rollers as they negotiate an auxiliary track.

15. An endless chain conveyor incorporating a conveying suface, main rollers for supporting said conveying surface, tracks for said main rollers arranged at each side of the conveying surface, endless driving chains arranged at each side of the conveying surface having links which are interconnected so as to permit hinging about both horizontal and vertical axes, sprockets for carrying and driving said endless driving chains, control rollers provided at each side of the conveying surface intermediate the main rollers aforesaid, means for supporting said control rollers from the respective endless driving chains, auxiliary tracks for the control rollers provided around a lateral bend to define and control the direction of travel of the endless driving chains around the lateral bend, said conveying surface being capable of variation of effective surface area to permit the conveying surface to negotiate lateral bends under the governance of said control rollers in association with the auxiliary tracks aforesaid, and means for resisting torque stresses which may be exerted on the endless driving chains at a lateral bend.

16. An endless chain conveyor as claimed in the preceding claim 15 in which the torque resisting means is in the form of an endless chain which is in driving association with the outermost endless driving chain at a position in advance of a lateral bend or curve and at a position in retard of the same bend or curve.

17. An endless chain conveyor as claimed in the preceding claim 15 in which the torque resisting chain is adapted to pass around a pulley of the outside of the bend or curve which is adapted to turn on a vertical axis.

18. An endless chain conveyor as claimed in the preceding claim 15 in which the torque resisting chains incorporate main links which are constituted by half-links which are hingedly connected at their inwardly presented ends about common pivots and links intermediate the said main links each of which consists of half-links which are hingedly connected at their inwardly presented ends about common pivots the axes of which are parallel to the axes of the common pivots of the half-links first mentioned and in which the outer end portion of a half-link of a main link is pivotally connected to the outer end portion of a half-link of a preceding intermediate link by a common pivot the axis of which is at right angles to the axes of the common axes aforesaid and in which the outer end of the other half-link of a main link is connected to the outer end portion of a half-link of a succeeding intermediate link in a like manner whereby the torque resisting chain can hinge about axes arranged at right angles to each other.

19. An endless chain conveyor as claimed in the preceding claim 15 in which the torque resisting chains are arranged to be passed around sprockets mounted on the same axles as the appropriately positioned carrying sprockets associated with the endless driving chains.

20. An endless chain conveyor as claimed in claim 15 in which the torque resisting chain is arranged to engage and leave the pulley tangentially.

References Cited by the Examiner
UNITED STATES PATENTS

| | | | |
|---|---|---|---|
| 2,641,351 | 6/1953 | Riley | 198—17 |
| 2,706,033 | 4/1955 | Williams | 198—182 |

EVON C. BLUNK, *Primary Examiner.*

RICHARD E. AEGERTER, *Examiner.*